(12) United States Patent
Banner et al.

(10) Patent No.: US 9,737,180 B2
(45) Date of Patent: Aug. 22, 2017

(54) TOILET WITH URINE DIVERSION AND METHOD FOR WASTE REUSE

(71) Applicants: Brandie Allesa Banner, Gainesville, GA (US); Jasmine Kaila Burton, Dunwoody, GA (US); Rebecca Wright Byler, Palo Alto, CA (US); Erin Buchanan Cobb, Marietta, GA (US)

(72) Inventors: Brandie Allesa Banner, Gainesville, GA (US); Jasmine Kaila Burton, Dunwoody, GA (US); Rebecca Wright Byler, Palo Alto, CA (US); Erin Buchanan Cobb, Marietta, GA (US)

( * ) Notice: Subject to any disclaimer, the term of this patent is extended or adjusted under 35 U.S.C. 154(b) by 174 days.

(21) Appl. No.: 14/615,533

(22) Filed: Feb. 6, 2015

(65) Prior Publication Data
US 2015/0245748 A1 Sep. 3, 2015

Related U.S. Application Data

(60) Provisional application No. 61/946,197, filed on Feb. 28, 2014.

(51) Int. Cl.
| | |
|---|---|
| *A61H 35/00* | (2006.01) |
| *A47K 11/02* | (2006.01) |
| *E03D 5/014* | (2006.01) |
| *E03D 9/08* | (2006.01) |

(52) U.S. Cl.
CPC .............. *A47K 11/02* (2013.01); *E03D 5/014* (2013.01); *E03D 9/08* (2013.01); *Y10T 29/4973* (2015.01)

(58) Field of Classification Search
CPC ............ A47K 11/02; A47K 11/03; E03D 4/05

USPC ................... 4/448, 464, 465, 467, 476, 477
See application file for complete search history.

(56) References Cited

U.S. PATENT DOCUMENTS

| | | | | |
|---|---|---|---|---|
| 187,991 | A * | 3/1877 | Thompson ............. | A47K 11/02 4/467 |
| 345,053 | A * | 7/1886 | Heap ...................... | B65D 75/32 4/464 |
| 577,306 | A * | 2/1897 | Kendrick ............... | A63C 17/18 280/12.14 |

(Continued)

FOREIGN PATENT DOCUMENTS

| | | |
|---|---|---|
| CA | 1185157 A1 | 4/1985 |
| CN | 102102377 A | 6/2011 |

(Continued)

OTHER PUBLICATIONS

World Health Organization. Simple Pit Latrines. <http://www.who.int/water_sanitation_health/hygiene/emergencies/fs3_4.pdf>. Sep. 2013.

(Continued)

*Primary Examiner* — Huyen Le
(74) *Attorney, Agent, or Firm* — Troutman Sanders LLP; Ryan A. Schneider

(57) ABSTRACT

The present disclosure includes an improved toilet and a system of using the improved toilet. The toilet can be configured to separate urine from solid waste, and further to separate solid waste according to size. The toilet can also comprise a personal cleansing system to clean a user's anus following use of the toilet. The present also discloses a method of maintaining the toilet and a method for removing the separated waste for re-use as a combustible fuel and fertilizer.

26 Claims, 9 Drawing Sheets

(56) References Cited

U.S. PATENT DOCUMENTS

| | | | |
|---|---|---|---|
| 912,856 A * | 2/1909 | Koons | B65D 75/32 4/111.1 |
| 6,640,355 B1 | 11/2003 | Samide | |
| 6,681,413 B2 * | 1/2004 | Weiss | A47K 11/02 4/449 |
| 7,135,116 B2 | 11/2006 | Haggerty | |
| 7,802,323 B2 * | 9/2010 | Al-Mutairi | A47K 11/04 4/321 |
| 7,846,143 B1 | 12/2010 | Abbato | |
| 2002/0193517 A1 | 12/2002 | Wang | |
| 2012/0054951 A1 * | 3/2012 | Wu | E03D 5/10 4/471 |
| 2013/0193047 A1 | 8/2013 | Lyon | |

FOREIGN PATENT DOCUMENTS

| | | |
|---|---|---|
| DE | 202008003712 U1 | 1/2009 |
| EP | 0346083 A2 | 12/1989 |
| EP | 0638803 A1 | 2/1995 |
| EP | 1135561 A1 | 9/2001 |
| EP | 1467035 A1 | 10/2004 |
| EP | 1669203 A1 | 6/2006 |
| EP | 1795211 A2 | 6/2007 |
| EP | 2160722 A1 | 3/2010 |
| EP | 2568885 A1 | 3/2013 |
| WO | 2005019545 A1 | 3/2005 |
| WO | 2007042764 A2 | 4/2007 |
| WO | 2007055011 A1 | 5/2007 |
| WO | 2008044806 A1 | 4/2008 |
| WO | 2008126793 A1 | 10/2008 |
| WO | 2010045696 A1 | 4/2010 |
| WO | 2010133089 A1 | 11/2010 |
| WO | 2013032154 A2 | 3/2013 |

OTHER PUBLICATIONS

Reliance Luggable Loo. REI. N.p., Web. Sep. 10, 2013. <rei.com/product/679029/reliance-luggable-loo>.

Cleanwaste PETT Portable Environmental Toilet. REI. N.p . . . Web. Sep. 10, 2013. <http://www.rei.com/product/662980/cleanwaste-pett-portable-environmental-toilet>.

Quick Set Portable Toilet CampigWorld. N.p . . . Web. Sep. 10, 2013. <http://www.campingworld.com/shopping/item/quick-set-portable-toilet/65906>.

How waterless toilets work. WooWoo: Waterless and composting toilets. N.p., n.d. Web. Sep. 15, 2013. <http://www.waterlesstoilets.co.uk/content/how-waterless-toilets-work-0.

Functional Diagram of the System.Stone BioTech. N.p., n.d. Web. Oct. 1, 2013. <http://stonebiotech.co.in/manufacturing-facilities.php>.

PeePoo. PeePoople. N.p . . . Web. Sep. 10, 2013. <http://www.peepoople.com/peepoo/start-thinking-peepoo/>.

The Crapper. Toilets for People. N.p., n.d. Web. Sep. 13, 2013. <http://www.toiletsforpeople.org/the-crapper/>.

EcoLove. Toil-O-Preneurs. N.p., n.d. Web. Sep. 12, 2013. < http://www.ecoloove.com/index.html>.

Borgen."5" innovative Toilet:3 for Developing Countries. N.p., n.d. Web. Sep. 16, 2013. <http://www.borgenmagazine.com/5-innovative-toilets-for-developing-countries/>.

Dehydraling Toilet. Bc—Ickcountry Energy Environmental Solutions. N.p., n.d. Web. Sep. 9, 2013. <http://www.beeshive.org/?page_id=90>.

Six of the Most Innovative Ways to Process Your Poo. Wired UK. N.p., n.d. Web. Sep. 4, 2013. <http://www.wired.co.uk/news/archive/2011-07/21/waterless-toilets>.

How Does It. Work? Kazuba. N.p., n.d. Web. Sep. 2, 2013. <http://www.kazuba.eu/index.php/en/how-does-it-work/8-how-does-it-work?start=6>.

Poo Powder® Waste Treatment! Poo Powder® Waste Treatment. N.p., n.d. Web. Sep. 4, 2013. <http://www.cleanwaste.com/poo-powder-waste-treatment>.

Wastewater Technology. Environmental Protection Agency. N.p., n.d. Web. Oct. 2, 2013. <http://water.epa.gov/scitech/wastetech/>.

Goodier, Rob. "Ten Ways to Put Human Waste to Use." Engineering for Change. N.p., n.d.Web. Sep. 10, 2013. <https://www.engineeringforchange.org/news/2012/11/21/ten_ways_to_put_human_waste_to_use.html>.

Mason, J. J., F. Leszko, T. Johnson, and R. D. Komistek. "Patellofemoral Joint Forces." ScienceDirect. N.p., n.d. Web. Oct. 9, 2013. ><http://www.sciencedirect.com/science/article/pii/S0021929008002340>.

Japanese vs. Western-style Toilets. RocketNews24 RSS. N.p., n.d. Web. Oct. 5, 2013. <http://en.rocketnews24.com/2013/08/28/japanese-vs-western-style-toilets-squatty-potty-stool-gives-us-the-best-of-both/>.

Introducing the Hygienna Solo. Introducing the Hygienna Solo. N.p., n.d. Web. Oct. 7, 2013. <http://hygienna.myshopify.com/>.

Blue Bidet. Blue Bidet. N.p., n.d. Web. Oct. 5, 2013. <http://www.bluebidet.com/>.

Pure Clean Fresh Water Spray Non-Electric Mechanical Bidet Toilet Seat Attachment. Amazon.com. N.p. n.d. Web. Oct. 7, 2013. <http://www.amazon.com/Pure-Clean-Non-Electric-Mechanical-Attachment/dp/B009R54IQM>.

Cleaning, Sterilization, & Maintenance of Surgical Instraments. Rep. N.p., n.d. Web. Oct. 20, 2013. <http://www.roboz.com/catalog%20pdfs/Sterilization_and_Maintenance.pdf>.

Slow Sand Filtration. Centers for Disease Control and Prevention. Centers for Disease Control and Prevention, Mar. 21, 2012. Web. Oct. 10, 2013. <http://www.cdc.gov/safewater/sand-filtration.html>.

Sustainable Organic Integrated Livelihoods. Models. N.o . . . Web. Sep. 11, 2013. <http://www.oursoil.org/what-we-do/toilets/models/>.

* cited by examiner

TOILET WITH URINE DIVERSION AND METHOD FOR WASTE REUSE

CROSS REFERENCE TO RELATED APPLICATIONS

This Application claims benefit, under 35 U.S.C. §119(e), to U.S. Provisional Application No. 61/946,197 filed Feb. 28, 2014, entitled "TOILET WITH URINE DIVERSION AND WASTE FILTRATION AND COLLECTION." The entire contents and substance of that application is hereby incorporated by reference as if set forth herein.

TECHNICAL FIELD

The present disclosure relates to an improved toilet and a system of using the improved toilet. In some embodiments, this disclosure relates to modular and moveable toilets.

BACKGROUND

Each year, millions of people are afflicted with sickness and death because they do not have access to basic sanitation facilities. Displaced populations living in refugee camps or other temporary living conditions experience these problems most acutely. In the absence of modern plumbing and conventional toilets, displaced populations often resort to open pit latrines for urination and defecation. While pit latrines are easy to construct, they present numerous public health and safety limitations.

For example, in areas affected by monsoons or other heavy rains, pit latrines tend to overflow and contaminate areas surrounding the pit. Further, stagnant waste can provide a breeding ground for mosquitoes and other insects, which often carry disease. Pit latrines also are only temporary, and must be filled in and replaced every four years. Because previously dug latrines cannot be reused, space to construct new latrines can be limited. Pit latrines also present a safety risk to children, who can fall into the open pit.

Pit latrines also do not accommodate some local traditional and religious practices. For example, in some refugee camps, a toilet design must be sensitive to cultural aversions to human waste. Some cultures require that individuals practice a form of personal cleansing to be considered pure for prayers and other religious activities. In these cultures, both the user and maintenance workers should have minimal contact with human waste while using and servicing the toilet. Because pit latrines frequently require workers to interact with waste, and do not provide for personal cleansing, they fail to accommodate these local customs and practices. Finally, in refugee camps and other temporary living conditions, there may be regulatory or practical prohibitions on constructing permanent structures, requiring that toilets be either portable or temporary.

For at least these reasons, there exists a need for a toilet that provides privacy, safety, cleanliness, compact size, and an aesthetically pleasing design that can be implemented at low cost in constrained conditions such as, but not limited to, refugee camps in underdeveloped regions. For similar reasons, such a system could also be used in other locations where access to basic sanitation facilities may be limited, such as camping.

SUMMARY

Some or all of the above needs can be addressed by certain implementations of the disclosure. In some embodiments of the present disclosure, a toilet is provided. The toilet can comprise a base, an intake module, a drawer system, and a urine container. Some embodiments further comprise a user cleansing system to aid in anal cleansing. In some embodiments, the intake module comprises an ergonomically-designed seating apparatus, a first channel leading to the urine container, and a second channel leading to the drawer system. Some embodiments further comprise a vent assembly with a cover which can selectively opened or closed. The cover can, in the closed position, close one or both of the channels leading to a urine container or drawer system.

In some embodiments of the present disclosure, a method is provided. In some embodiments, the method includes the steps of removing liquid waste from the urine container, and removing solid waste from the drawer system. In some embodiments, the method can further include the steps of replacing and/or sterilizing one or more filters in the drawer system. In some embodiments, the method can include processing liquid or solid waste. In one example, the liquid waste can be purified and diluted to produce a high-nitrogen fertilizer. In another example, the solid waste can be dried and/or sterilized, and converted into fuel briquettes.

In some embodiments, a toilet can comprise a base with a top surface and a bottom surface, an intake module coupled to the top surface of the base and adapted to receive a user, a drawer system detachably attached to the bottom surface of the toilet, and a urine container in fluid communication with the intake module, the urine container coupled to the bottom surface of the base.

Some embodiments comprise a seat, a urine diversion system formed into the seat, the urine diversion system having a first top opening and a second top opening, the first top opening and second top opening positioned a predetermined distance apart, a first channel in communication with the first top opening, a second channel separate from the first channel and in communication with the second top opening, a first bottom opening in communication with the first channel and the urine container, and a second bottom opening in communication with the second channel and the drawer system.

Some embodiments comprise a seat that is adapted to receive a user in a squatting position such that the angle between the femur and tibia of the user are positioned at an angle of less than 45 degrees.

Some embodiments comprise a water reservoir the top surface of the base, a plunger disposed within the water reservoir, a tube connecting the water reservoir to the intake module, and a nozzle connected to the tube, on the nozzle located proximate the intake module, wherein the nozzle is positioned at an angle to be aimed approximately at the anus of a user engaging the seat.

In some embodiments, a nozzle is aimed upward at an angle between 30 and 60 degrees to horizontal.

In some embodiments, the position of the nozzle is adjustable by the user.

In some embodiments, the drawer system comprises a first container positioned below the intake module, a first filter located proximate the bottom of the first container, a second container positioned below the first container, a second filter located proximate the bottom of the second container, and a third container positioned below the second container.

In some embodiments, a first container and second container are removable from the drawer system.

In some embodiments, a first filter is a metal filter having openings of approximately 10 mm.

In some embodiments, a second filter is a cheesecloth filter having openings of approximately 1 mm.

In some embodiments, a intake module comprises a cover sized to cover the first and second channels, the cover slidably connected to the urine diversion system, and a first handle located proximate a side of the seat, the first handle connected to the cover.

In some embodiments, a toilet comprises a second handle connected to the base, the second handle located adjacent to the intake module.

In some embodiments, a drawer system comprises a wheel attached to the bottom of the drawer system.

In some embodiments, the drawer system has a door adapted to receive a lock.

In some embodiments, a toilet comprises a structure enclosing the base, the structure having a door and a vent opening.

In some embodiments, a door of the structure is adapted to receive a lock.

A method is provided, comprised of removing urine from a urine container, removing solid waste from a first container, removing pathogenic material from a second container, removing used user cleansing water from a third container, sterilizing a first filter, and removing and replacing a second filter.

A method is provided, comprised of filtering the urine to remove contaminants, and diluting the filtered urine to form a high-nitrogen fertilizer.

A method is provided, comprised of removing a first metal filter from the toilet, and sterilizing the first metal filter by heating the first metal filter.

A method is provided, comprised of removing a second filter from the toilet, removing from the second filter solids collected by the second filter, and burning the second filter and the solids collected by the second filter.

A method is provided, comprised of filtering the user cleansing water to remove contaminants, and using the filtered user cleansing water to dilute the urine.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

In accordance with the present disclosure, a system and method are provided. In some embodiments, the system provides an inexpensive and mobile toilet. In some embodiments, this disclosure provides a method for maintaining the toilet and for reusing urine and feces deposited therein. Some implementations of the disclosure will be described more fully hereinafter with reference to the accompanying drawings. This disclosure can, however, be embodied in many different forms and should not be construed as limited to the implementations set forth herein.

In the following description, numerous specific details are set forth. It is to be understood, however, that embodiments of the disclosure can be practiced without these specific details. In other instances, well-known methods, structures, and techniques have not been shown in detail in order not to obscure an understanding of this description. References to "one embodiment," "an embodiment," "example embodiment," "various embodiments," etc., indicate that the embodiment(s) of the disclosed technology so described can include a particular feature, structure, or characteristic, but not every embodiment necessarily includes the particular feature, structure, or characteristic. Further, repeated use of the phrase "in one embodiment" does not necessarily refer to the same embodiment, although it can.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form. As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example implementations of the disclosure will now be described with reference to the accompanying figures.

Figure 1:
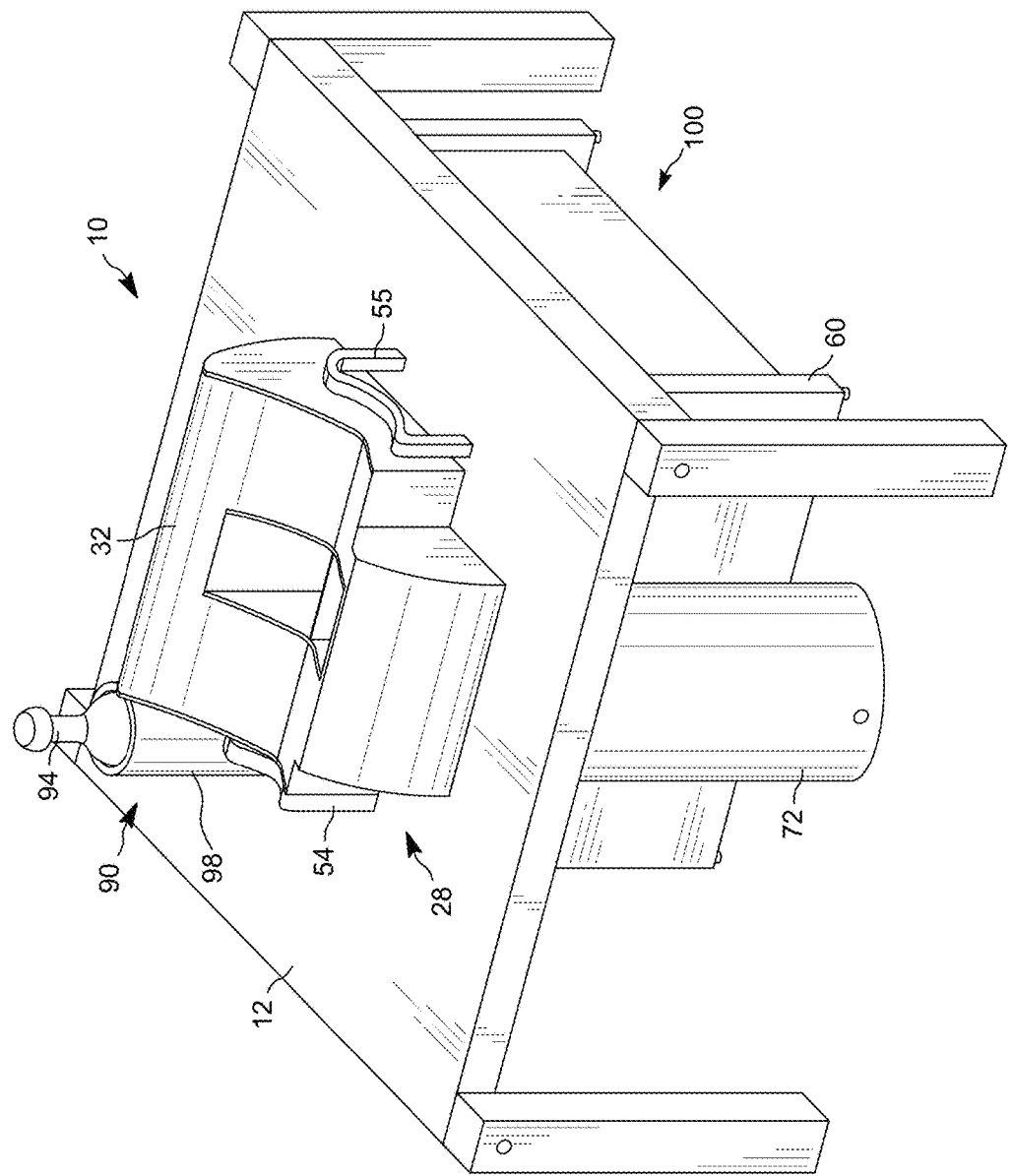
FIG. 1 is an illustration of an assembled toilet in accordance with an embodiment of the present disclosure.
Figure 2:
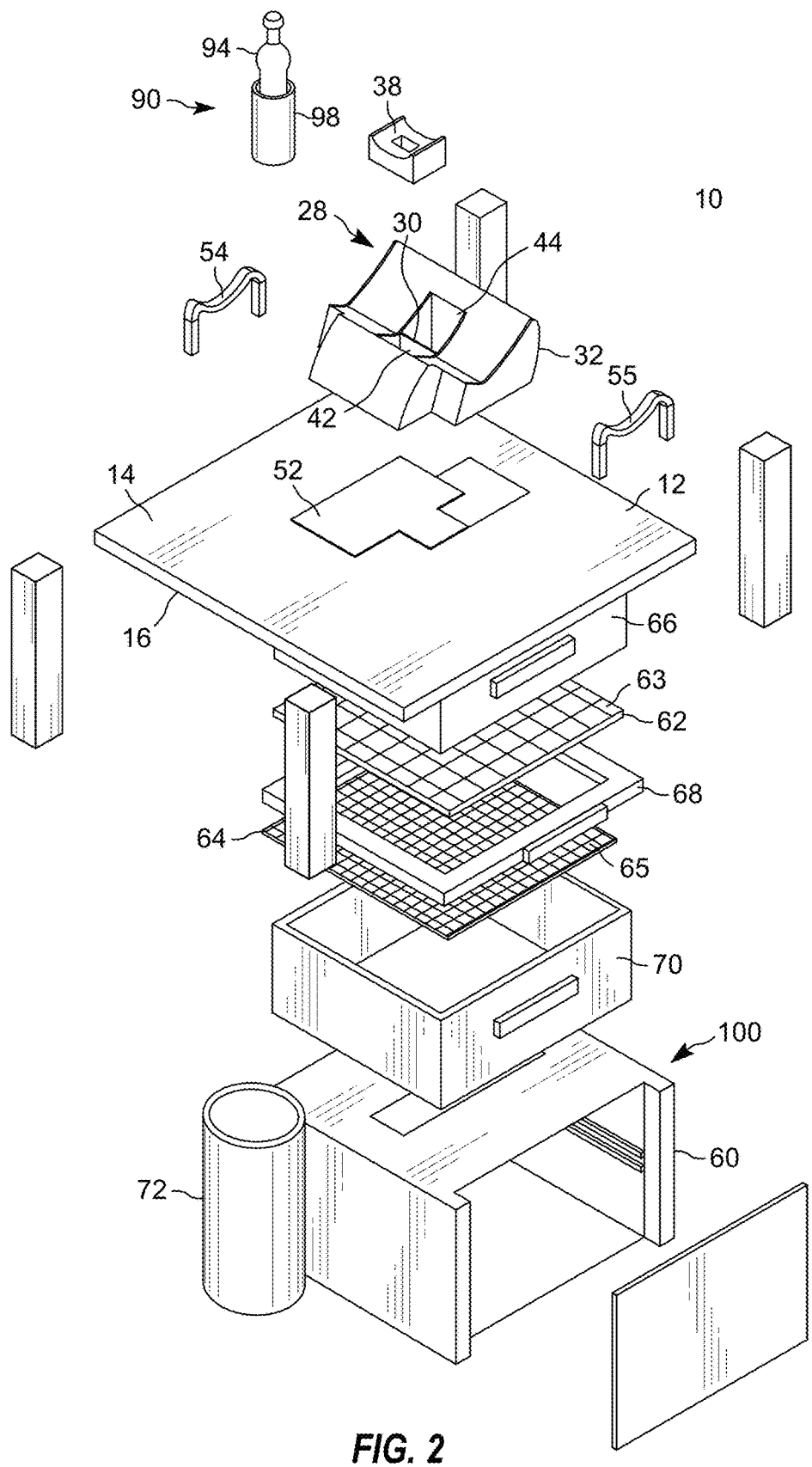
FIG. 2 is an exploded view of the assembled toilet in accordance with an embodiment of the present disclosure.

FIG. 1 illustrates an assembled toilet 10 in accordance with an embodiment of the present disclosure. FIG. 2 is an exploded view of a toilet 10 in accordance with an embodiment of the present disclosure. In some embodiments, the toilet 10 can comprise a base 12 having a top surface 14 and a bottom surface 16, adapted to support a user of the toilet, and adapted to be detachably attached to the drawer system 100. In some embodiments, the toilet 10 can comprise an intake module 28, having a seat 32, and a urine diversion system 30 positioned above the base 12. In some embodiments, the toilet 10 further comprises a user cleansing system 90. The user cleansing system can comprise a water reservoir 98, plunger 94, tubing 93 (shown in FIG. 8), and nozzle 96 for use in user cleansing following use of the toilet 10, and be located above the base 12. Additionally, in some embodiments, the toilet 10 can further comprise a structure 110 for privacy and security, as shown in FIG. 9.

In some embodiments, the toilet 10 can be adapted to conform to space constraints for locating toilets inside homes. In some embodiments, the toilet base 12 can have a height of less than or equal to about two feet. The horizontal cross-sectional area of the base 12 can have an area of less than or equal to about one square meter, according to one embodiment. Also, in some embodiments, the toilet 10 can occupy less than about one cubic meter. But it would be readily apparent to those skilled in the art that the base 12 or toilet 10 could be otherwise sized or shaped without departing from the scope of this disclosure.

Some embodiments of the toilet 10 can overcome problems associated with using below-ground space for sanitation. According to some embodiments, the toilet 10 is capable of being deployed entirely above ground, for example, in a household setting or a camp setting. Above-ground deployment can allow an individual to easily move the toilet 10 from one location to another. Above-ground deployment can also allow for placement of the toilet 10 in locations where local regulations prevent the erection of permanent structures. Above-ground deployment can further prevent the need to dig pits, such as those used in pit latrines, which are prone to overflowing due to excessive use or heavy rains. But it will be readily apparent to those skilled in the art that a portion or the entire toilet 10 could be below-ground without departing from the scope of this disclosure. Specific features of some embodiments of the disclosed toilet 10 are discussed below.

Intake Module

In one embodiment, the intake module 28 of the present disclosure can comprise a seat 32 and a urine diversion system 30. In some embodiments, the intake module 28 can be mounted on the base 12. The intake module 28 can comprise an ergonomic seat 32 for using the toilet 10, as will be discussed herein. Further, the intake module 28 can provide for the separation of liquid waste from solid waste, can prevent ingress of trash and other debris into the system, and can prevent egress of noxious odors from the toilet 10, as will be discussed herein.

Figure 4:
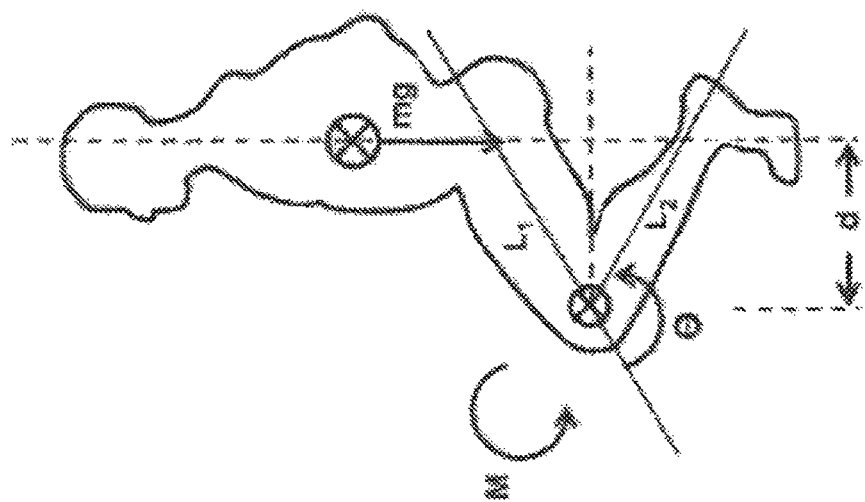
FIG. 4 is a free-body diagram of a person in a squatting position, modeling the internal torque at the patellofemoral joint.
Figure 3:
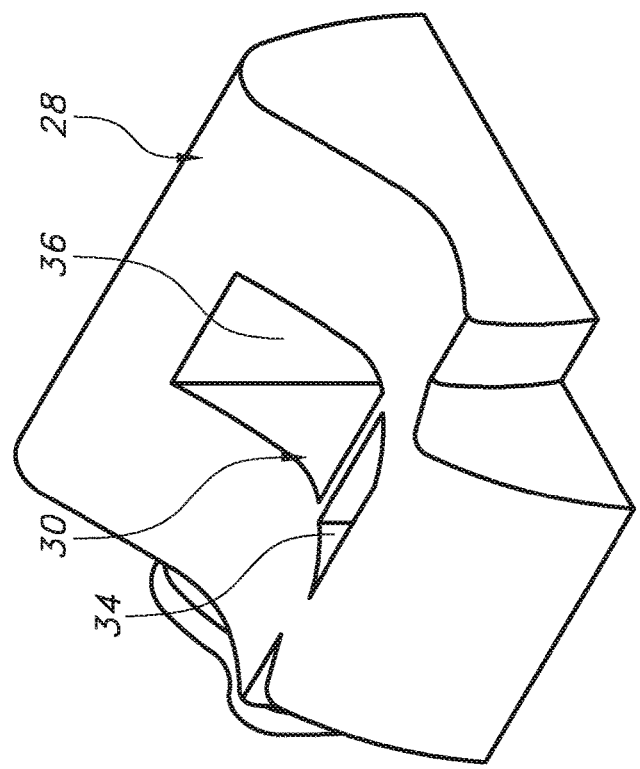
FIG. 3 is an illustration of an intake module in accordance with an embodiment of the present disclosure.
Figure 5:
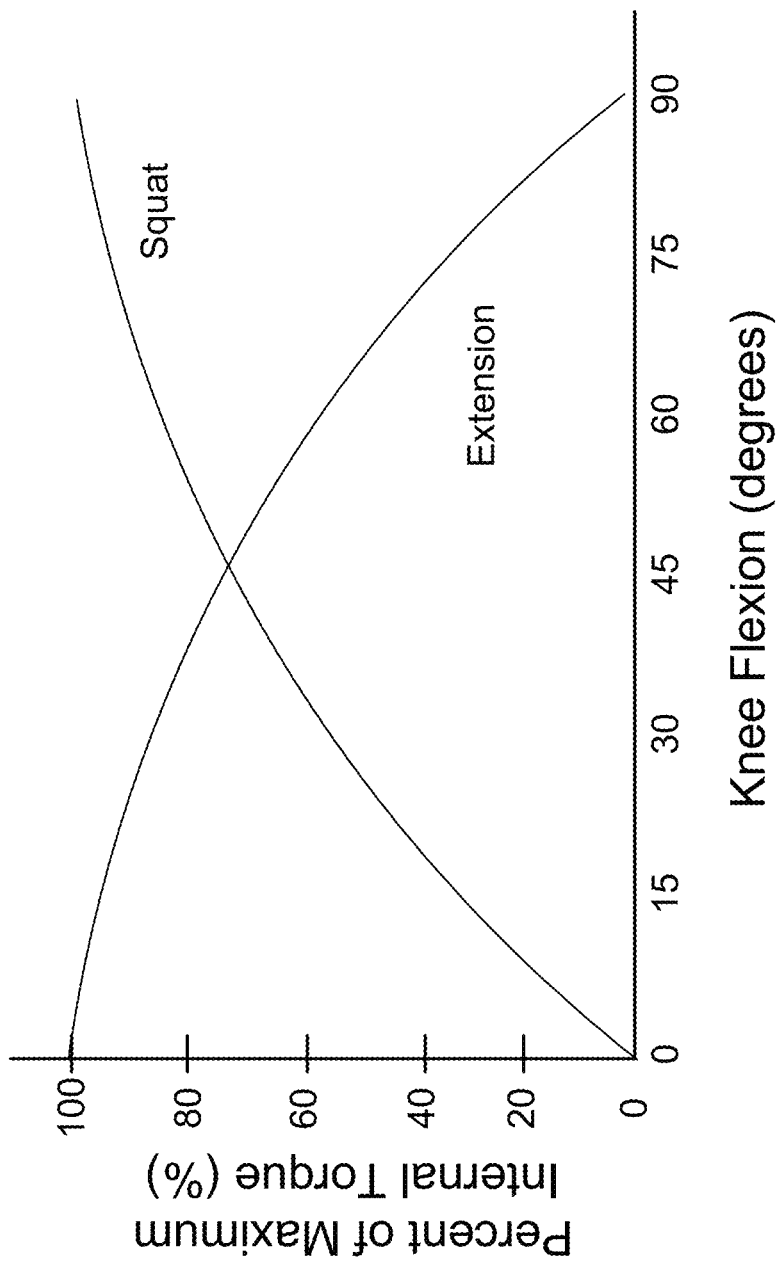
FIG. 5 is a graph showing the relationship between percentage of maximum internal torque and knee flexion.

FIG. 3 illustrates a seat 32 in accordance with the present disclosure. In some embodiments, the seat 32 can provide an ergonomic seat for use of the toilet 10 in a sitting position, squatting position, or both a sitting and squatting position. The seat 32 can be designed to facilitate an ergonomically-advantageous squatting position. FIG. 4 provides a free-body diagram of a squatting user, and FIG. 5 illustrates the relationship of knee flexion to maximum internal torque. Enhanced user comfort and reductions in joint and muscle fatigue can be achieved by minimizing force at the patellofemoral joint. Thus, the seat 32 can be designed to accommodate the contours of the human body in a squatting position that minimizes that force. It has been determined that the angles of minimal patellofemoral force for a user's knee are angles below 45 degrees, or angles greater than 135 degrees, measured as the angle between a user's femur and tibia. Thus, the optimal position for squatting and defecating occurs when the knee is almost completely bent, or almost completely straight.

In some embodiments, the seat 32 can be designed to maximize how effectively a user can evacuate their large intestine. Sitting or standing hinders feces from fully leaving the large intestines, leaving some residue inside the colon and rectum. In contrast, squatting allows for complete elimination of feces from the large intestines. Moreover, when standing, the puborectalis muscle hinders the rectum to maintain continence, while squatting relaxes the puborectalis muscle allowing for easier elimination of feces. It has been determined that the puborectalis muscle is the most relaxed at anorectal angles between 25 degrees and 45 degrees, which occur in a squatting position. Therefore, in some embodiments, the seat 32 can be adapted to facilitate a squatting, rather than sitting or standing, position. Further, in some embodiments, the seat can be adapted to permit a user to squat on the seat, and to facilitate a 35 degree angle in the bend of a user's knee, maximizing both comfort and effectiveness. But it would be readily apparent to those skilled in the art that the seat 32 could be adapted to facilitate other knee angles or otherwise shaped without departing from the scope of this disclosure. By way of example and not limitation, elderly or disabled users may need to defecate near a standing position, with a knee angle of greater than 135 degrees.

Figure 6:
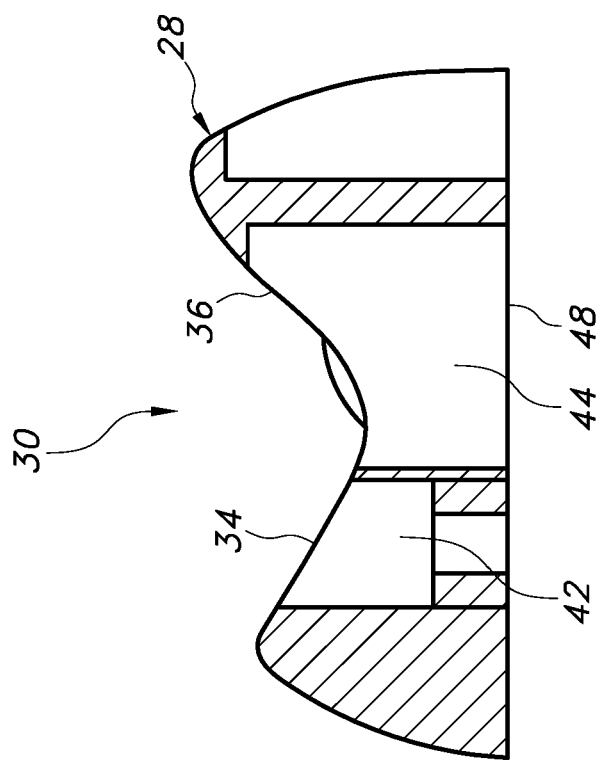
FIG. 6 is a cut-away drawing of an intake module in accordance with an embodiment of the present disclosure.

FIG. 6 illustrates a urine diversion system 30 in accordance with an embodiment of the present disclosure. In some embodiments, the urine diversion system 30 is configured to separate liquid waste from solid waste. In some embodiments, the urine diversion system 30 of the intake module 28 can include a first top opening 34 and a second top opening 36 that are received in, and extend through the interior of the seat 32 to create a first channel 42 and a second channel 44. In some embodiments, the first channel 42 can funnel urine through a first bottom opening 46. In some embodiments, the second channel 44 can direct other waste through a second bottom opening 48. In an embodiment, the first channel 42 processes urine, and the second channel 44 processes feces, used personal cleansing water, and other waste. In some embodiments, the first channel 42 can route liquid waste into a urine container 72, and a second channel 44 can route solid waste, including diarrhea or vomit, into the drawer system 100.

In some embodiments, the first and second top openings 34, 36 can be located a predetermined distance apart to mimic the natural location of the anus and urethra of a user while squatting. This distance can correspond to the average distance between the anus and urethra in women, which has been determined to be about 4.8 cm, and generally falls in the range of approximately 3.5 cm to 7.0 cm. In one embodiment, the first opening 34 has a diameter of about 3 cm. In some embodiments, the second opening 36 has a diameter of about 20 cm. The larger opening for the second opening 36 can be selected to ensure compatibility with a wide range of users of different sizes. The wider radius also can advantageously allow for potentially non-linear trajectories of feces as it exits the anus. If an individual were to voluntarily forcefully expel the stool downwards by increasing the pressure in their abdominal cavity, it is possible that the exiting stool will have a horizontal velocity in addition to falling from gravity. Experimental results revealed that the maximum horizontal distance covered between the user and the second top opening 36 is approximately 3.8 cm. But it would be readily apparent to those skilled in the art that other diameters could be used for the first opening 34 and/or the second opening 36 and that other distances between first and second opening 34, 36 could be used without departing from the scope of this disclosure. Additionally, other distances can be selected where the intended users are men, users with a disability, or are of a particular ethnic group that can have a different average spacing, or for other reasons.

Figure 7:
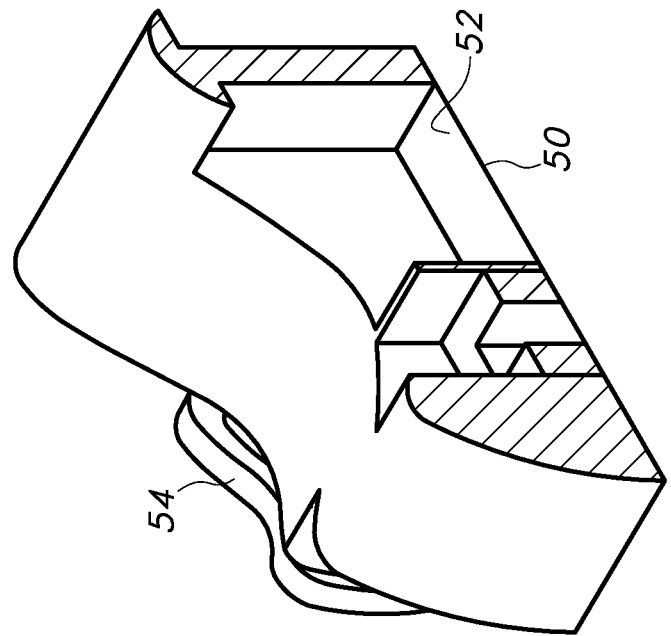
FIG. 7 is a cut-away drawing of an intake module in accordance with an embodiment of the present disclosure, particularly showing the channel cover.

FIG. 7 illustrates a vent assembly in accordance with an embodiment of the present disclosure. In some embodiments, the intake module 28 further includes a vent assembly which can have a cover 52 and a handle 54. In such embodiments, the vent assembly can prevent odors from escaping containers 66, 68, 70, 72 of drawer system 100 (described in detail below) and can prevent unintended articles, such as garbage, animals, or children, from entering the channels 42, 44. When the toilet 10 is not in use, the cover 52 can remain closed to prevent odors from escaping.

In some embodiments, a user of the toilet 10 can manipulate the handle 54 to toggle the channel cover 52 between a deployed position and retracted position. In some embodiments, the vent assembly further can include a mechanism for maintaining the channel cover 52 in a deployed position until the handle 54 is manipulated by a user to cause the cover 52 to enter a retracted state. Additionally, the handle 54 can be gripped by a user to support a user's weight. In some embodiments, the handle 54 is located proximate the seat 32 on the right side of the toilet 10. In some embodiments, a second handle 55 (shown in FIG. 1) can be located on the opposite side of the seat from the first handle, and adapted to support a user's weight. But it would be readily apparent to those skilled in the art that the vent assembly, including the handle 54, and second handle 55, could be otherwise located, otherwise configured, or omitted without departing from the scope of this disclosure.

In some embodiments, the urine diversion system 30 further comprises a funnel 38 received proximate the first top opening 34 or first channel 42 for helping to direct liquid therein. The funnel 38 can minimize potential splashing and can restrict the accidental introduction of any solid waste into the first channel 42.

Urine Container

The toilet 10 can comprise a urine container 72 to collect liquid waste from the intake module 28. This liquid waste can be collected and used as a fertilizer, as urine contains a significant amount of nitrogen.

FIG. 2 illustrates an embodiment where a urine container 72 is in communication with the first channel 42 to collect the liquid waste. In some embodiments, gravity can cause urine to pass through the funnel 38, the first channel 42, and into the urine container 72. The urine container 72 can further include a spigot-tube system for removing urine on-site.

Drawer System

Some embodiments of the present disclosure can comprise a drawer system 100. While the toilet 10 is in use, gravity can cause non-urine waste to pass into the second channel 44, through the second bottom opening 48 and into the drawer enclosure 60. In some embodiments, this drawer system 100 can comprise a plurality of filters for sorting the solid waste by particle size as it passes through one or more filters. The drawer system 100 can also be used to separate solid feces from diarrhea, vomit, and water used for personal cleansing. In some embodiments, waste particles of different sizes can be sorted into three containers 66, 68, 70. In some embodiments, the drawer system 100 can provide for fast, effective waste separation and also can enhance dehydration of feces. By separating solid feces, the feces can be removed, dehydrated, and turned into briquettes for energy generation.

FIG. 2 illustrates an embodiment of the drawer system 100. In an embodiment, the filters are arranged in drawers, similar to a dresser. In some embodiments, the containers 66, 68, and 70 can be housed in a self-contained drawer enclosure 60, and be capable of being removed from the toilet 10. The self-contained drawer system 100 can comprise wheels for improving mobility and to facilitate maintenance of the system. In some embodiments, at least a portion of the self-contained drawer system 100 can be received in the base 12. Further, in some embodiments, the self-contained drawer system 100 can be locked or secured against displacement or tampering.

In some embodiments, the first container 66 can be located proximate to, and below the intake module 28, and can be adapted to receive waste through the second channel 44 of the urine diversion system 30. In some embodiments, the first filter 62 can be located proximate the bottom of the first container 66 and the second filter 65 can be located proximate the bottom of the second container 68. In some embodiments, the first filter 62 can be located at the bottom of the first container 66 and the second filter 65 can be located at the bottom of the second container 68. The first container 66 can comprise a first filter 62 for catching solid waste, such as feces.

In some embodiments, the first filter 62 is a coarse sieve filter. The first filter 62 can be made of plastic, metal or other materials. In one embodiment, the first filter 62 comprises a metal wire mesh, with openings 63 about 10 mm in size. In some embodiments, the first filter 62 can be cleaned and sterilized between uses by heating. In one embodiment, the first filter 62 is placed at an angle to horizontal, between about 3 degrees and 13 degrees, and in some embodiments, 5 degrees. This angle can prevent accumulation of solid waste directly beneath the second opening by spreading them across the mesh, and can prevent occlusion of the mesh.

A second container 68 can be located below the first container 66. In some embodiments, a second filter 64 can be located in the second container 68, and can be used for catching vomit, diarrhea, and particulate matter from feces not captured by the first filter 62. This second filter 64 can be used to catch small solid waste, solids in diarrhea or vomit, or smaller pieces of fecal matter that fall through the first filter 62. In one embodiment, this second filter 64 is made of cheesecloth, having filter openings 65 of approximately 1 mm. In embodiments where the second filter 64 is made of an inexpensive or disposable material, like cheesecloth, it can be burned at regular intervals to eliminate pathogens, such as parasites, bacteria, and microbes. Also, as with the first filter 62, the second filter 64 can be placed at an angle to horizontal, between 3 and 13 degrees, to prevent occlusion of the filter 64, although in some embodiments the filter can be approximately horizontal.

In embodiments that comprise a first filter 62 and second filter 64, selection of vertical spacing between the first filter 62 and second filter 64 can prevent clogging of the first filter 62 and second filter 64 after repeated defecations. Where the filters 62 and 64 are touching, feces tend to accumulate and can clog the first filter 62 and second filter 64. In an experiment, it was discovered that locating the first filter 62 and second filter 64 between 10 and 50 mm apart results in filter clogging, whereas spacings between 50 and 150 mm prevent clogging, and enable the filtration system to operate with repeated use. As would be obvious to a person having ordinary skill in the art, other spacings between the first filter 62 and second filter 64 are contemplated by this disclosure, and are presented by way of example only. Further, as would be obvious to a person having ordinary skill in the art, other filter materials, opening sizes, and filter angles for the first filter 62 and second filter 64 are contemplated by this disclosure, and the specific embodiments disclosed presented by way of example only.

In some embodiments, a third container 70 can be used to collect any liquids, including water used by the personal cleansing system 90. This third container 70 can be located below the second container 68, and can catch any materials, such as liquids, not collected by the first or second filters 62, 64.

In some embodiments, the first, second, and third containers 66, 68, 70 can be sized according to the number of users, average toilet use, and maintenance schedule. By way of example and not limitation, an embodiment can comprise containers 66, 68, 70, 72 of a size and height adapted for use by a household of about five users and weekly maintenance. In such embodiments the first container 66 has a volume of at least about 30 L (2.12 cu. ft.), the second container 68 has a height of at least about 50 mm, the third container 70 has a volume of at least about 40 L (3.01 cu. ft.), and the urine container 72 has a volume of at least about 20 L (1.83 cu. ft.). However, other container sizes can be used for different numbers of users, different maintenance schedules, or for other reasons without departing from the scope of this disclosure.

User Cleansing System

In some cultures, it is customary for toilet users to engage in anal cleansing following defecation. Such practices can bring users into direct contact with pathogenic solid waste. As an alternative, some embodiments of the present disclosure further comprise a user cleansing system 90 to facilitate anal cleansing following defecation.

Figure 8:
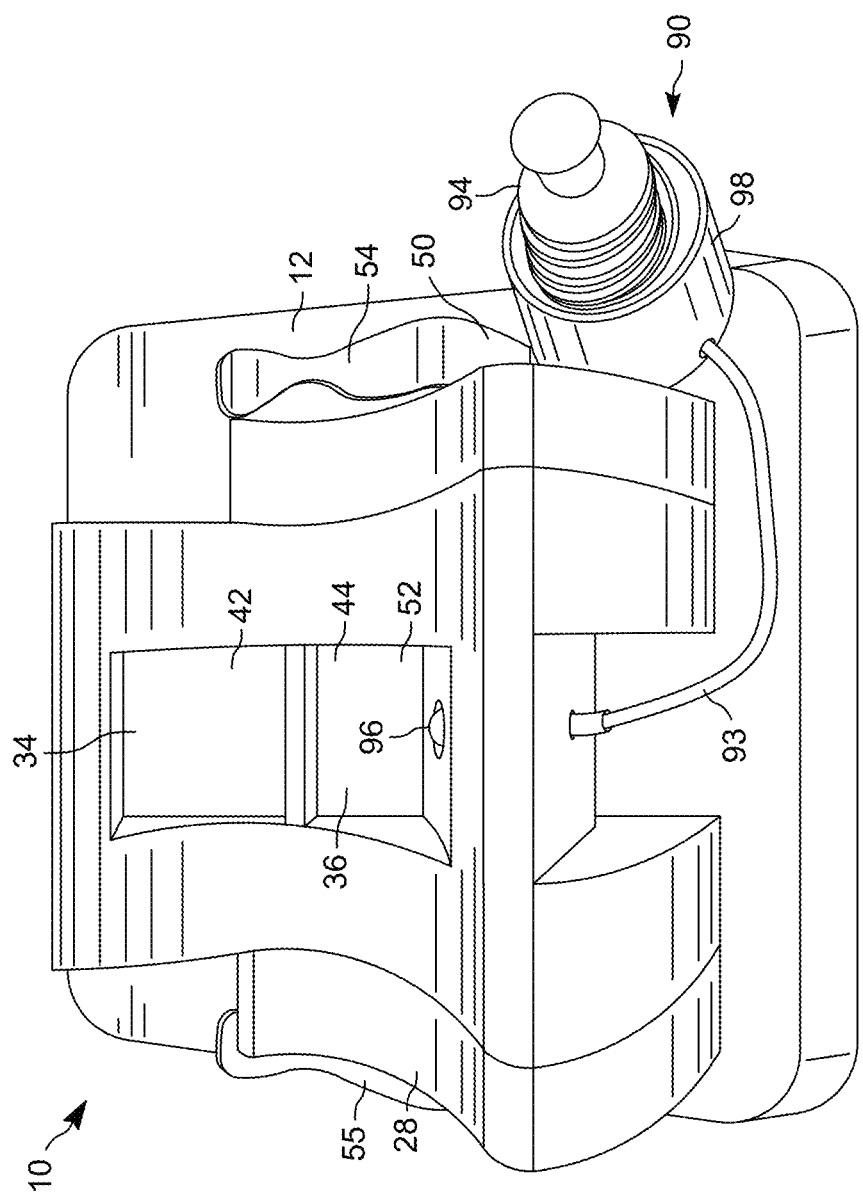
FIG. 8 is a top-view of an intake module in accordance with an embodiment of the present disclosure, particularly showing the handle for the channel cover, and a personal cleansing system in accordance with an embodiment of the present disclosure.
Figure 9:
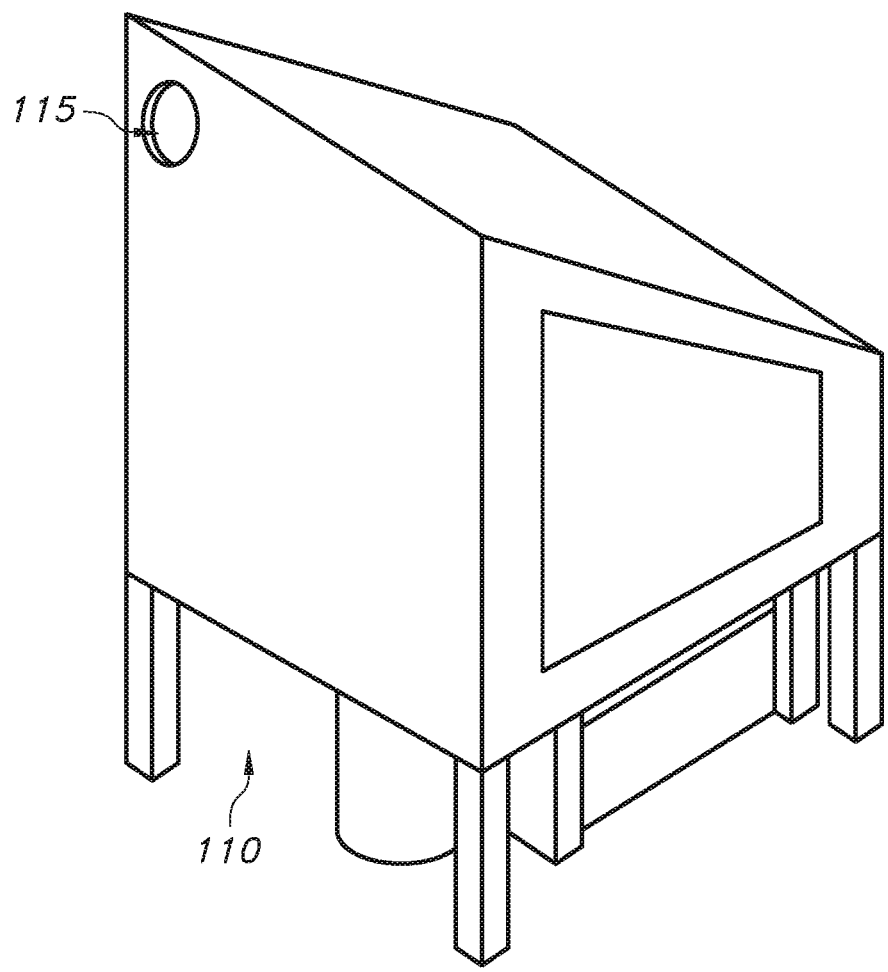
FIG. 9 is a structure in accordance with some embodiments of the present disclosure.

FIG. 8 depicts a user cleansing system 90 in accordance with an embodiment of the present disclosure. In such embodiments, water can be pumped through a tubing system 93 that is directed at the user's anus. A downward force can be applied to a plunger 94 to create a pressure differential in reservoir 98 causing outward flow of water through the tubing system 93 at velocity sufficient to clean feces from the anus. In some embodiments the user cleansing system 90 can further include a nozzle 96 to facilitate control of the direction of flow to allow for faster removal of feces and less usage of water.

In some embodiments, the user cleansing system 90 includes a cylindrical, hollow water reservoir 98 with a capacity corresponding to the average weekly usage of anal cleansing water. In some embodiments, the capacity of the water reservoir 98 is about 1.5 L. It will be readily apparent to those skilled in the art that other sized containers can be used without departing from the scope of the present disclosure.

In some embodiments, the minimum pressure required for a person to expel water from the bidet-like nozzle 96 can be 0.158 psi. In some embodiments, the tubing 93 can be connected to the back of the seat 32, and aimed upward at an angle between 30 and 60 degrees from horizontal to optimize waste removal, with open access for additional manual manipulation of this angle by the user if necessary. By way of example, and not limitation, in some embodiments, the nozzle can be aimed upward at 45 degrees from horizontal. It will be readily apparent to those skilled in the art other configurations or locations of the reservoir 98, plunger 94 and tubing system 92 could be used or other types of personal cleansing systems chosen without departing from the scope of this disclosure.

Structure

FIG. 9 illustrates a structure 110 in accordance with some embodiments of the present disclosure. In some embodiments, the toilet 10 further includes a structure 110, similar to a traditional pit latrine hut. The structure 110 can include several features, such as being built on a platform, having a door and/or a lock, and can be easily mass-produced.

This structure 110 provides several privacy and security features to the toilet 10. Because the structure 110 is enclosed, users of the system can use it with a greater degree of privacy. In some embodiments, the structure 110 comprises a locking mechanism that can increase that sense of privacy by allowing a user to lock the door while the system is in use. Further, the locking system can be used to secure the system against theft, vandalism, or unauthorized use. The structure 110 can also include a ventilation opening 115 that allows odors to escape the structure 110.

Maintenance of System and Reuse of Collected Waste

Servicing of the toilet 10 described herein, or other similar toilet technologies can comprise a method for maintaining the toilet 10 and reusing the collected human waste products. By way of example, and not limitation, the present toilet 10 can be designed and used according to a weekly maintenance schedule.

Figure 10:
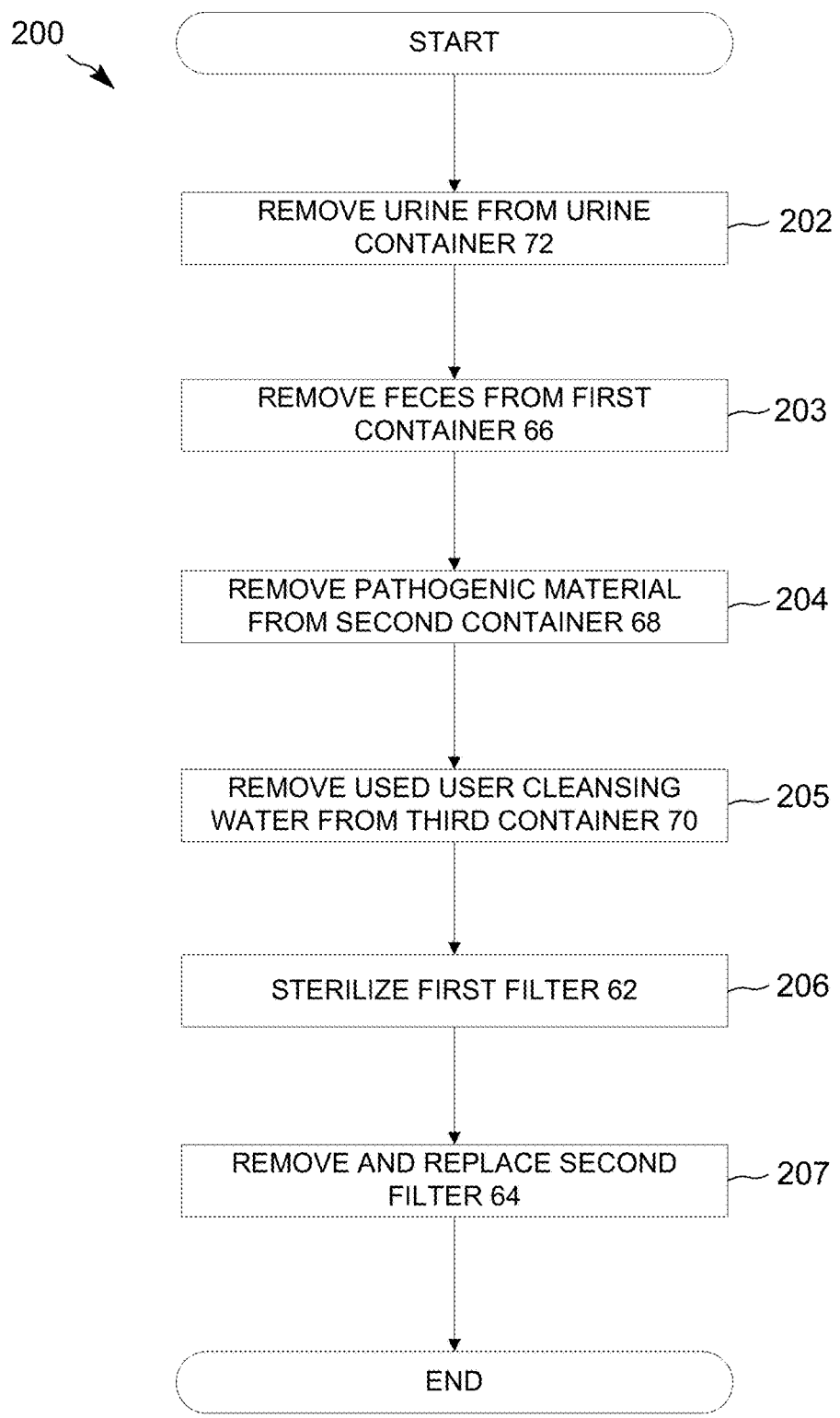
FIG. 10 is a flow diagram depicting a maintenance and waste collection process in accordance with an embodiment of the present disclosure.

At the weekly servicing of the system, the servicing process can comprise maintenance and waste collection steps, and waste reuse steps. FIG. 10 depicts a maintenance and waste collection process 200 in accordance with an embodiment of the present invention. In method 200, maintenance and waste collection can comprise emptying several containers of human waste, including emptying the urine container 72 of collected urine at 202. The method can further comprise the removal of feces from a first container 66 at 203, removal of pathogenic material from a second container 68 at 204, or removal of used user cleansing water from a third container 70 at 205. But, in embodiments that can omit one or more containers, the corresponding maintenance steps can be omitted. Further, different containers can be designed for different maintenance schedules, and thus only some containers can be emptied during a maintenance process.

Servicing the toilet 10 can further comprise maintenance steps, wherein the toilet is prepared for re-use. In some embodiments, this comprises sterilizing the first filter 62 at 206. In embodiments where the first filter 62 comprises a metal mesh, this can involve sterilizing the first filter by heating to remove pathogens. Alternatively, other sterilization methods can be used, such as chemical treatment, or other methods where the first filter is not a metal filter.

Maintenance steps can further comprise removing the second filter 64 at 207. Where the second filter 64 is made of a flammable material, such as cheesecloth, the method can include removing the filter and burning it. The second filter 64 can then be replaced. Alternatively, the second filter 64 can be made of a reusable material, and thus sterilized and reused, rather than replaced.

Figure 11:
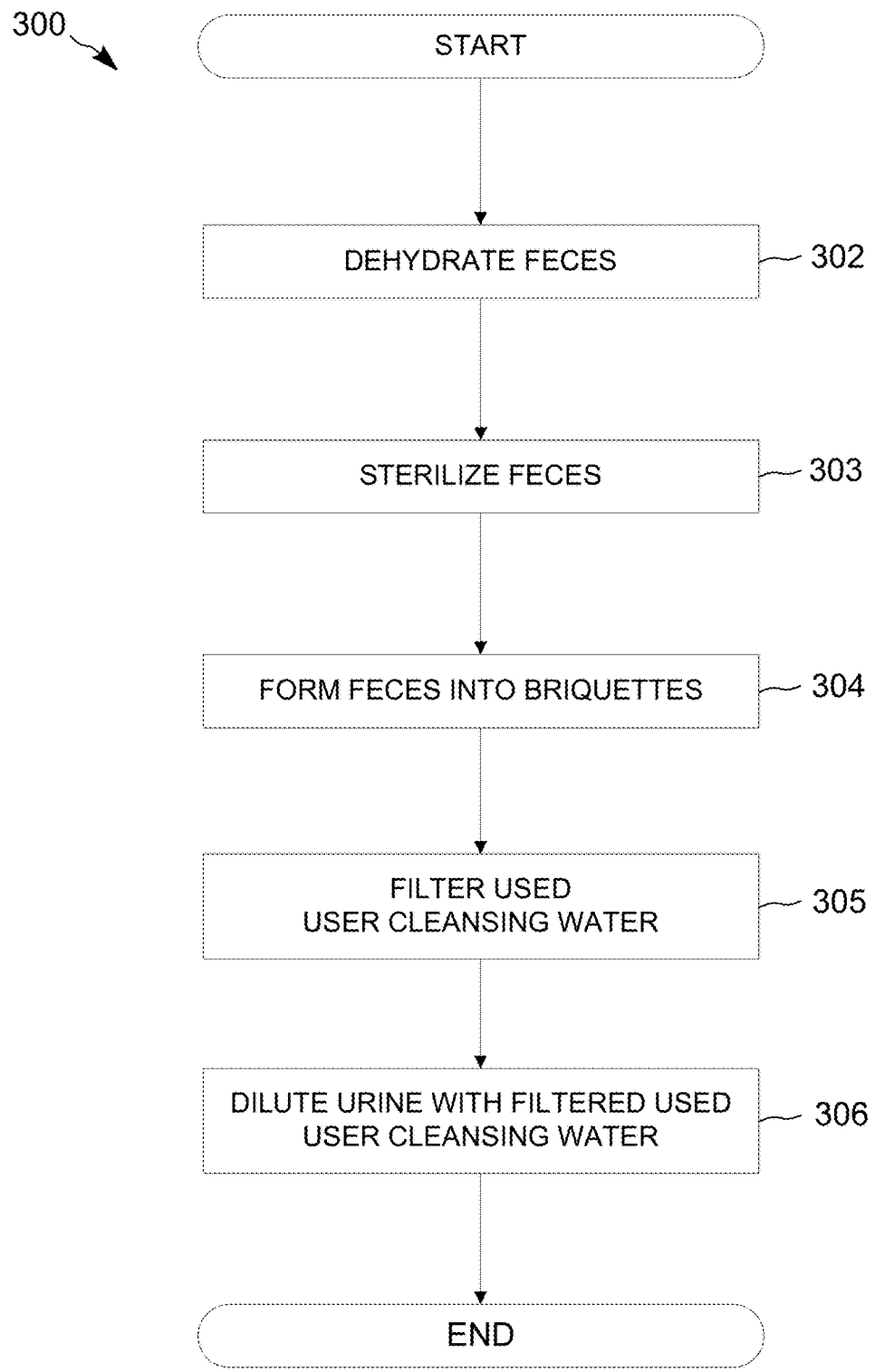
FIG. 11 is a flow diagram depicting a waste reuse process in accordance with an embodiment of the present disclosure

Once maintenance is complete, the collected urine, feces, and used personal cleansing water can be processed for re-use. FIG. 11 depicts a reuse process in accordance with an embodiment of the present invention. In some embodiments, the urine, feces, and used personal cleansing water can be transported for a central site for processing, though other embodiments can reprocess the waste products elsewhere.

Reprocessing the feces can comprise processing the feces into combustible fuel, steps 302, 303, 304. This process can comprise a dehydrating step 302, a sterilizing step 303, and a forming step 304. In some embodiments, the dehydrating and sterilizing steps 302, 303 can be performed simultaneously. Sterilization of the solid waste 303 can be performed by heating it to a temperature at which pathogens cannot survive. Following sterilization 303, it can be formed into briquettes which can be burned to produce energy, step 304. In some embodiments, the feces are not processed into combustible fuel, but can be used for other purposes. In some embodiments, the feces can be used as fertilizer. In some embodiments, the feces can be simply discarded. As would be understood by a person having ordinary skill in the art, the feces can be processed or used for other purposes.

In some embodiments, the contents of the third container 70 can be removed and filtered to remove pathogens, and reused, at 305. In particular, the filtered water can be mixed with collected urine at 306, in a predetermined ratio for use as a nitrogen-rich fertilizer. In some embodiments this ratio is 4:1. But it will be readily apparent to those skilled in the art that filtration systems other than sand filtration could be used and further that the purified water could be used for a different purpose or in different water to urine ratios without departing from the scope of this disclosure.

In some embodiments, a maintenance worker can perform the maintenance and waste collection methods 200 on a weekly basis. But it will be apparent to those skilled in the art that the present disclosure could be modified to provide for sterilization and/or replacement of the filters 62, 64, or any other filters without a maintenance worker or with a non-weekly maintenance worker without departing from the scope of this disclosure. Furthermore, it will be also apparent to those skilled in the art that the present disclosure could be modified to include on-site processing instead of centralized processing of feces, or to omit generation of energy from processed feces without departing from the scope of this disclosure.

Locally Constructed Embodiments

In some embodiments, the disclosure can be constructed from materials locally available in the region of use (for example, in Kenya). This allows for some embodiments of the toilet 10 to be locally created in the region of use. This can minimize the cost of transporting the toilet 10, and any necessary parts for maintaining the toilet 10.

In some embodiments, the seat 32 can be ergonomically designed and molded from clay found in soil of the region of use. The molds can comprise a two-sided mold for repeat production, and can be manufactured via vacuforming. In some embodiments, locals from the region of use can be employed for the completion of manufacturing from the vacuformed mold. In some embodiments, soft clay can be compressed by hand within the molded acrylic cavity and then leveled off to create consistency between parts, and the molded cavity can then be screwed into another acrylic plate to maintain balance as the clay goes through a drying process. In some embodiments, manufacturing the toilet 10 further comprises allowing water to evaporate from the clay material over three days as it enters a stage commonly called "greenware." In some embodiments, the mold can then be heated or fired in a kiln for another three days to be deemed usable. During the drying and firing process of these embodiments, clay can lose four to fifteen percent of its total volume.

The clay utilized by some embodiments offers impressive material strength, natural wear resistance, and possible economic benefit. In some embodiments, the cost of both the clay material and manufacturing for the toilet seat 32 can be only $15 USD per unit. But it will be readily apparent to those skilled in the art that manufacturing can take place in another region, with different materials, or using a different process without departing from the scope of this disclosure.

In some embodiments, high density polyethylene (HDPE) plastic constitutes a vast majority of the material used in parts such as the seat 32, the vent assembly handles 54 and 55, and the drawer system 100. HPDE plastic provides strength, impact resistance, and versatility at low cost. But it will be readily apparent to those skilled in the art that other materials can be selected without departing from the scope of this disclosure.

In some embodiments of the present disclosure, injection and rotational molding can be used during manufacturing. Though rotational molding offers cost advantages for a 17,000 unit output value, the process is not readily available worldwide and thus would require additional importing expenses in some parts of the world.

Accordingly, some embodiments of the present disclosure comprise utilizing locally available manufacturing methods, such as injection molding, for manufacturing of parts. But it will be readily apparent to those skilled in the art that manufacturing can take place in another region or using a different process without departing from the scope of this disclosure.

While certain implementations of the disclosure have been described in connection with what is presently considered to be the most practical and various implementations, it is to be understood that the disclosure is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosure, including the best mode, and also to enable any person of ordinary skill to practice certain implementations of the disclosure, including making and using any devices or systems and performing any incorporated methods. The patentable scope of certain implementations of the disclosure is defined in the claims, and can include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:

1. A toilet comprising:
  a base comprising a top surface and a bottom surface;
  an intake module coupled to the top surface of the base, the intake module comprising a seat and adapted to receive a user;
  a water reservoir the top surface of the base;
  a plunger disposed within the water reservoir;
  a tube connecting the water reservoir to the intake module; and
  a nozzle connected to the tube and located proximate the intake module, wherein the nozzle is positioned at an angle to be aimed approximately at the anus of the user engaging the seat.

2. The toilet of claim 1, the intake module further comprising:
  a urine diversion system formed into the seat, the urine diversion system having a first top opening and a second top opening, the first top opening and second top opening positioned a predetermined distance apart;
  a first channel in communication with the first top opening;
  a second channel separate from the first channel and in communication with the second top opening;
  a first bottom opening in communication with the first channel and the urine container; and
  a second bottom opening in communication with the second channel and the drawer system.

3. The toilet of claim 1, wherein the seat is adapted to receive the user in a squatting position such that the angle between the femur and tibia of the user are positioned at an angle of less than 45 degrees.

4. The toilet of claim 1 further comprising:
a drawer system detachably attached to the bottom surface of the toilet; and
a urine container in fluid communication with the intake module, the urine container coupled to the bottom surface of the base.

5. The toilet of claim 4, the drawer system having a wheel attached to the bottom of the drawer system.

6. The toilet of claim 4, the drawer system having a door adapted to receive a lock.

7. The toilet of claim 4, wherein the drawer system comprises:
a first container positioned below the intake module;
a first filter located proximate the bottom of the first container;
a second container positioned below the first container;
a second filter located proximate the bottom of the second container; and
a third container positioned below the second container.

8. The toilet of claim 1, wherein the nozzle is aimed upward at an angle between 30 and 60 degrees to horizontal.

9. The toilet of claim 1, wherein the position of the nozzle is adjustable by the user.

10. The toilet of claim 1 further comprising a structure enclosing the base, the structure having a door and a vent opening.

11. The toilet of claim 10, wherein the door of the structure is adapted to receive a lock.

12. A toilet comprising:
a base comprising a top surface and a bottom surface;
an intake module coupled to the top surface of the base, the intake module adapted to receive a user;
a drawer system detachably attached to the bottom surface of the toilet; and
a urine container in fluid communication with the intake module, the urine container coupled to the bottom surface of the base;
wherein the drawer system comprises:
a first container positioned below the intake module;
a first filter located proximate the bottom of the first container;
a second container positioned below the first container;
a second filter located proximate the bottom of the second container; and
a third container positioned below the second container.

13. The toilet of claim 12, wherein the first container and second container are removable from the drawer system.

14. The toilet of claim 12, wherein the first filter is a metal filter having openings of approximately 10 mm.

15. The toilet of claim 12, wherein the second filter is a cheesecloth filter having openings of approximately 1 mm.

16. The toilet of claim 12, wherein the intake module comprises a seat adapted to receive the user in a squatting position such that the angle between the femur and tibia of the user are positioned at an angle of less than 45 degrees.

17. The toilet of claim 12 further comprising:
a seat of the intake module;
a water reservoir in proximity to the top surface of the base;
a plunger disposed within the water reservoir;
a tube connecting the water reservoir to the intake module; and
a nozzle connected to the tube, on the nozzle located proximate the intake module, wherein the nozzle is positioned at an angle to be aimed approximately at the anus of the user engaging the seat.

18. A toilet comprising:
a base comprising a top surface and a bottom surface;
an intake module coupled to the top surface of the base, the intake module adapted to receive a user;
a drawer system detachably attached to the bottom surface of the toilet; and
a urine container in fluid communication with the intake module, the urine container coupled to the bottom surface of the base;
wherein the intake module comprises:
a seat;
a urine diversion system formed into the seat, the urine diversion system having a first top opening and a second top opening, the first top opening and second top opening positioned a predetermined distance apart;
a first channel in communication with the first top opening;
a second channel separate from the first channel and in communication with the second top opening;
a first bottom opening in communication with the first channel and the urine container;
a second bottom opening in communication with the second channel and the drawer system;
a cover sized to cover the first and second channels, the cover slidably connected to the urine diversion system; and
a first handle located proximate a side of the seat, the first handle connected to the cover.

19. The toilet of claim 18 further comprising a second handle connected to the base, the second handle located adjacent to the intake module.

20. The toilet of claim 18, wherein the intake module further comprises a seat adapted to receive the user in a squatting position such that the angle between the femur and tibia of the user are positioned at an angle of less than 45 degrees.

21. The toilet of claim 18 further comprising:
a water reservoir in proximity to the top surface of the base;
a plunger disposed within the water reservoir;
a tube connecting the water reservoir to the intake module; and
a nozzle connected to the tube, on the nozzle located proximate the intake module, wherein the nozzle is positioned at an angle to be aimed approximately at the anus of the user engaging the seat.

22. The toilet of claim 18, wherein the drawer system comprises:
a first container positioned below the intake module;
a first filter located proximate the bottom of the first container;
a second container positioned below the first container;
a second filter located proximate the bottom of the second container; and
a third container positioned below the second container.

23. A maintenance and waste collection method, comprising:
removing urine from a urine container;
removing solid waste from a first container;
removing pathogenic material from a second container;
removing used user cleansing water from a third container;

sterilizing a first filter; and
removing and replacing a second filter.

24. The method of claim 23 further comprising:
filtering the urine to remove contaminants; and
diluting the filtered urine to form a high-nitrogen fertilizer.

25. The method of claim 23 further comprising:
removing a first metal filter from the toilet; and
sterilizing the first metal filter by heating the first metal filter.

26. The method of claim 23 further comprising:
removing a second filter from the toilet;
removing from the second filter solids collected by the second filter; and
burning the second filter and the solids collected by the second filter.

\* \* \* \* \*